Dec. 11, 1956   E. O. SWICKARD, JR   2,773,386
LIQUID LEVEL INDICATOR
Filed Feb. 21, 1955

WITNESSES

INVENTOR.
EARL O. SWICKARD
BY ATTORNEY

United States Patent Office 2,773,386
Patented Dec. 11, 1956

2,773,386

LIQUID LEVEL INDICATOR

Earl O. Swickard, Jr., Los Alamos, N. Mex., assignor to the United States of America as represented by the United States Atomic Energy Commission Application February 21, 1955, Serial No. 489,816

3 Claims. (Cl. 73—313)

This invention relates to electrical signalling systems and more particularly to devices used to indicate the level of liquids.

Previous methods and apparatus for determining the level of a liquid in a sealed container from a remote location have not achieved the accuracy and linearity necessary to measure the level of certain liquids, as for example, radioactive liquids where the precise determination of the liquid level is important. Also, previous methods and apparatus for determining the level of a liquid in a sealed container from a remote location have not been adaptable to extreme level ranges such as encountered in radioactive liquid storage systems and chemical processing plants.

An object of this invention is to provide a method and apparatus for manually or automatically continuously determining the level of a liquid in an economical, simple and reliable manner.

Another object of this invention is to provide a method and apparatus for manually or automatically remotely determining the level of a liquid in an economical, simple and reliable manner regardless of the depth differential of the liquid.

Another object of this invention is to provide a method and apparatus for manually or automatically remotely determining the level of a liquid with an electrical signalling system wherein the properties of the liquid do not affect the operation of this invention.

Another object of this invention is to provide a method and apparatus for manually or automatically determining the level of a liquid with an electrical signalling system wherein the properties of the liquid do not affect the operation of said invention, and whereby the liquid level is indicated accurately by an indicator which is linearly related to the liquid level regardless of the depth differential of the liquid.

Figure 2:
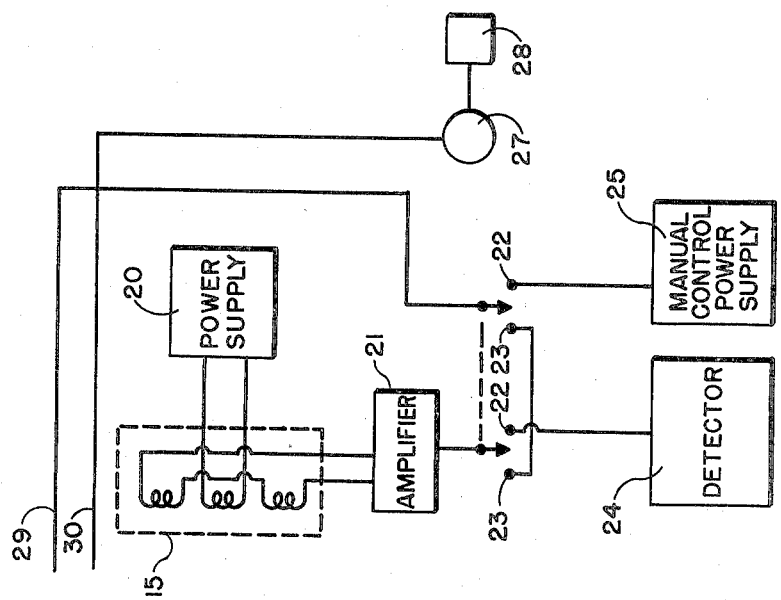
Figure 1:
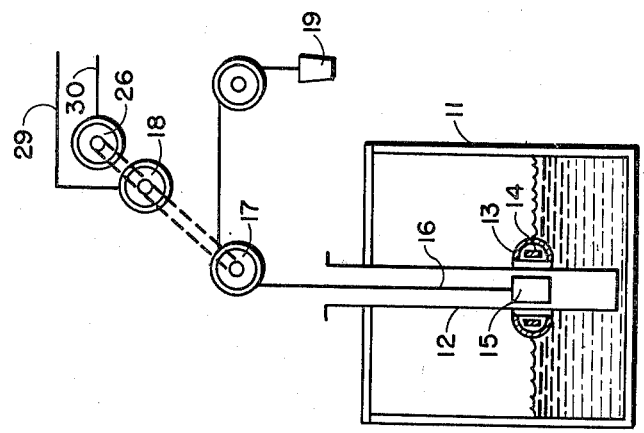

Further objects of this invention will be apparent from the following specification and claims which include a preferred embodiment of the present invention, and from the drawings, hereby made a part of the specification, wherein:

Figure 1 is a schematic view showing the mechanical relationship of the elements of the signalling system constituting the present invention, and Figure 2 is a schematic view showing the electrical relationship of the elements of the signalling system constituting the present invention.

This invention relates generally to an electrical signalling system for tanks of high temperature, corrosive, radioactive liquids or the like and comprises a level sensing device in the liquid containing tank, a control circuit and a liquid level indicating circuit.

Referring to Figure 1 of the drawing, a vessel 11 containing, for example, an amount of hot corrosive liquid under pressure, has a non-magnetic re-entrant tube or thimble 12 extending into the vessel from the top. The re-entrant tube is open to the atmosphere at its top and sealed on its bottom. A toroidal shaped float 13 is freely slidable along the outer surface of the re-entrant tube 12, and contains a core 14 of high-mu ferromagnetic material. A differential transformer 15 freely slidable within the re-entrant tube 12 is suspended by a chain 16 running over sprocket 17 and attached to counterweight 19. Sprocket 17 is rotated by motor 18. Motor 18 also rotates synchro-transmitter 26. Electrical circuit lines 29 and 30 are connected to 29 and 30 of Figure 2.

In Figure 2, differential transformer 15 has its primary coil connected to power supply 20, and the secondary coils connected to amplifier 21. Amplifier 21 may be connected to detector 24 by means of switch 22 or to electrical control line 29 by means of switch 23. When amplifier 21 is connected to detector 24 by means of switch 22, manual control power supply 25 will be connected to electrical control line 29 thru another circuit of switch 22. Synchro-receiver 27 and indicating means 28 are connected to syncho-transmitter 26 of Figure 1 by means of electrical control line 30 as hereinbefore mentioned.

In order to explain the automatic operation, assume that the differential transformer 15 is centered with respect to high-mu metal core of the float 13 in Figure 1. If the liquid level changes, the level of the float will change and the differential transformer 15 will no longer be centered. Since the transformer is not centered, the asymmetry of the secondary coils with respect to the high-mu core will cause the transformer output voltage to be unbalanced. This unbalance voltage will be used as an input signal to the amplifier 21, the magnitude of the unbalance voltage representing the amount of asymmetry and the phase relationship of the unbalance voltage representing the direction of asymmetry. The amplifier 21, connected to switch 23, will send an amplified output signal to the motor 18 which will operate sprocket 17 and chain 16 of Figure 1 in a direction determined by the phase relationship of the transformer output signal until the transformer 15 has been repositioned and is no longer sending a signal to the amplifier. Counterweight 19 is an aid to the precise positioning of transformer 15.

In order to explain the manual control system, again assume that the differential transformer 15 is centered with respect to the high-mu metal core of the float 13 in Figure 1. If the liquid level changes, the level of the float will change and the differential transformer 15 will no longer be centered. Since the transformer is not centered, the asymmetry will create an unbalance voltage as described above and will send a signal to the amplifier 21 of Figure 2 if the transformer 15 is near enough to the float as to cause a signal to be produced. The amplifier now connected to switch 22 will send this amplified signal to detector 24.

Under these conditions, an operator will by means of manual control power supply 25, operate motor 18 in such a direction as to cause transformer 15 to again be centered and consequently move the sensing element in detector 24 to a balance or null position. It may be necessary to do this by trial and error if an amplifier signal is not available at the start of the manual operation due to the transformer 15 being entirely out of range. The main purpose of the manual control is to reposition the transformer 15 if the displacement of the transformer with respect to the core becomes so large thru a power failure or otherwise, that no signal is produced.

Connected to motor 18 is a rotating synchro-transmitter 26 (Figure 1) by which the position of the transformer 15, and therefore the float 13 is indicated to a rotating synchro-receiver 27 (Figure 2) connected to a revolution counter 28 or other indicating device. The apparatus of Figure 2 may be located remotely from the pressure vessel.

In this manner, the transformer 15 will either automatically or by manual control assume a position of equilibrium with respect to the core 14 which will be at the level of the liquid in the pressure vessel 11, and will indicate on indicating device 28 the level of the liquid.

It is understood that the invention as described is the preferred embodiment, and that certain variations will not alter the operation or results. For example, the vessel does not have to contain a liquid under pressure, nor does the liquid have to be radioactive or corrosive. It is further understood, for example, that the re-entrant tube does not have to terminate in the liquid, but may pass thru the container. Although the tube cannot be constructed entirely of ferro-magnetic material, it is understood that a thin plating of magnetic material such as might be used for corrosion resistance will not hamper the operation. Also, the liquid level remote indicating mechanism has been described as a rotating transmitter-receiver means, though it is understood that other electrical or mechanical transmitter-receiver means may be used.

What is claimed is:

1. An apparatus for indicating the level of a liquid in a closed container comprising a high-mu ferromagnetic toroidal element supported inside a float, a non-ferromagnetic tube having a closed bottom end and a length greater than the depth of the container and being sealed to and supported vertically by the top of the container so that it depends in said container, said float surrounding and freely slidable along said tube and floating on the surface of said liquid, a differential transformer having a length approximately equal to the height of the float and being slidably supported within said tube, said transformer adapted to produce an unbalance voltage when asymmetric in relation to said toroidal element, remote means responsive to an unbalanced voltage for moving said transformer to a symmetric balanced voltage position, said symmetric position having a known relation to the level of the liquid.

2. An apparatus for indicating the level of a liquid comprising a tank, an open center high-mu ferromagnetic element, open center float means responsive to the liquid level for positioning said element, a vertical tube having a closed bottom end and a length greater than the depth of the liquid, being supported vertically in the tank and threading said ferromagnetic element, a movable differential transformer slidably supported in said tube adjacent to said element, said transformer adapted to produce an unbalance voltage when asymmetric in relation to said element, suspension means supporting said transformer in said tube and extending out of the upper end of the tube, an amplifier adapted to amplify said unbalance voltage, servo means responsive to said amplified voltage and coupled to said suspension means to move said transformer to a position of symmetry, transmitter and receiver means adapted to remotely indicate the position of said differential transformer, said position of symmetry having a known relation to the level of the liquid.

3. An apparatus for indicating the level of a liquid enclosed in a container comprising a high-mu ferromagnetic toroidal element supported by a float, a non-magnetic re-entrant tube in said container, said tube being supported vertically in the container, having a length equal, substantially, to the height of the container, being sealed at its lower end and having its outer surface sealed to the upper wall of the container, said float freely slidable along said tube and floating on the surface of said liquid, a differential transformer suspended and movable within said tube, said transformer adapted to produce an unbalance voltage when asymmetric in relation to said float, servo-mechanism means for moving said differential transformer, amplifier means responsive to said unbalance voltage and electrically connected to said servo-mechanism for moving said transformer to a symmetric balanced voltage position, said symmetric position having a known relation to the level of the liquid, and transmitter and receiver means connected to said servo-mechanism means and responsive to the movement of said servo-mechanism means, whereby said level of said liquid is indicated by said transmitter and receiver means.

References Cited in the file of this patent

UNITED STATES PATENTS

| | | |
|---|---|---|
| 2,357,745 | Kliever | Sept. 5, 1944 |
| 2,569,106 | James | Sept. 25, 1951 |
| 2,620,661 | Roux | Dec. 9, 1952 |
| 2,660,059 | Dean | Nov. 24, 1953 |

OTHER REFERENCES

Selsyn Operated Devices, Bulletin 110, Bailey Meter Co., October 1929.